United States Patent
Patel et al.

(10) Patent No.: US 12,422,844 B2
(45) Date of Patent: Sep. 23, 2025

(54) SYSTEM AND METHOD FOR PREDICTING NON-OPERATIONAL DESIGN DOMAIN (ODD) SCENARIOS

(71) Applicant: TuSimple, Inc., San Diego, CA (US)

(72) Inventors: Rinku Kumar Patel, Kalamazoo, MI (US); Joyce Tam, Pleasanton, CA (US)

(73) Assignee: TUSIMPLE, INC., San Diego, CA (US)

( * ) Notice: Subject to any disclaimer, the term of this patent is extended or adjusted under 35 U.S.C. 154(b) by 315 days.

(21) Appl. No.: 18/189,049

(22) Filed: Mar. 23, 2023

(65) Prior Publication Data
US 2023/0367309 A1    Nov. 16, 2023

Related U.S. Application Data

(60) Provisional application No. 63/364,605, filed on May 12, 2022.

(51) Int. Cl.
| | | |
|---|---|---|
| *G05D 1/00* | (2024.01) | |
| *B60W 50/00* | (2006.01) | |
| *B60W 60/00* | (2020.01) | |

(52) U.S. Cl.
CPC ....... *G05D 1/0027* (2013.01); *B60W 50/0097* (2013.01); *B60W 60/001* (2020.02); *G05D 1/0022* (2013.01); *B60W 2556/45* (2020.02)

(58) Field of Classification Search
CPC .. G05D 1/0289; G05D 1/0214; G05D 1/0223; G05D 1/0291; B60W 30/0956; B60W 30/162; B60W 50/0097; G01C 21/3407; G01C 21/3461; G08G 1/20; G08G 1/22
See application file for complete search history.

(56) References Cited

U.S. PATENT DOCUMENTS

| | | | |
|---|---|---|---|
| 11,900,797 B2 * | 2/2024 | Ramamoorthy | B60W 60/0027 |
| 2017/0305423 A1 | 10/2017 | Green | |
| 2019/0094868 A1 | 3/2019 | Zych | |
| 2019/0163180 A1 | 5/2019 | Patel et al. | |
| 2020/0039528 A1 * | 2/2020 | Ewert | G07C 5/008 |
| 2020/0110406 A1 | 4/2020 | Krishnamurthy et al. | |
| 2020/0257298 A1 * | 8/2020 | Ucar | H04W 4/46 |
| 2021/0078175 A1 * | 3/2021 | Liu | G05D 1/0223 |
| 2021/0173401 A1 | 6/2021 | Zych | |
| 2022/0068253 A1 * | 3/2022 | Pignier | G10K 11/17881 |
| 2022/0092231 A1 * | 3/2022 | Shen | G06F 30/15 |
| 2022/0212677 A1 * | 7/2022 | Zheng | B60T 8/17551 |
| 2022/0276662 A1 * | 9/2022 | Ponda | G05D 1/042 |

* cited by examiner

*Primary Examiner* — Hussein Elchanti
(74) *Attorney, Agent, or Firm* — Perkins Coie LLP

(57) ABSTRACT

A system and method for predicting non-operational design domain (ODD) scenarios are disclosed. In one aspect, a server includes a network communication device configured to communicate with an autonomous vehicle over a network, a memory, and a processor configured to receive information related to the navigation of the autonomous vehicle from a plurality of data sources. The processor is further configured to predict whether the autonomous vehicle will encounter a non-ODD scenario based on the received information and transmit a signal to the autonomous vehicle in response to predicting that the autonomous vehicle will encounter the non-ODD scenario.

16 Claims, 6 Drawing Sheets

SYSTEM AND METHOD FOR PREDICTING NON-OPERATIONAL DESIGN DOMAIN (ODD) SCENARIOS

CROSS-REFERENCE TO RELATED APPLICATION(S)

This application claims the benefit of U.S. Provisional Application No. 63/364,605, filed May 12, 2022, which is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field

The present disclosure relates generally to autonomous vehicles. More particularly, the present disclosure is related to systems and methods for predicting whether an autonomous vehicle will encounter a non-operational design domain (ODD) scenario.

Description of the Related Technology

One aim of autonomous vehicle technologies is to provide vehicles that can safely navigate towards a destination with limited or no driver assistance. The safe navigation of an autonomous vehicle (AV) from one point to another may include the ability to signal other vehicles, navigating around other vehicles in shoulders or emergency lanes, changing lanes, biasing appropriately in a lane, and navigating all portions or types of highway lanes.

Certain environmental conditions may be outside of the operational design domain (ODD) for an autonomous vehicle such that the autonomous vehicle cannot be assumed to safely navigate during the environmental conditions. Thus, it is desirable to safely avoid or stop navigation when an autonomous vehicle encounters a non-ODD scenario.

SUMMARY OF CERTAIN INVENTIVE ASPECTS

In one aspect, there is provided a server comprising: a network communication device configured to communicate with an autonomous vehicle over a network; a memory; and a processor configured to: receive information related to navigation of the autonomous vehicle from a plurality of data sources, predict whether the autonomous vehicle will encounter a non-operational design domain (ODD) scenario based on the received information, and transmit a signal to the autonomous vehicle in response to predicting that the autonomous vehicle will encounter the non-ODD scenario.

In some embodiments, at least one of the plurality of data sources is available via the cloud.

In some embodiments, at least one of the plurality of data sources comprises another autonomous vehicle within a same fleet as the autonomous vehicle.

In some embodiments, the processor is further configured to: assign a numerical value to the information received from each of the plurality of data sources, and sum the numerical values, wherein the prediction of whether the autonomous vehicle will encounter the non-ODD scenario is further based on the sum of the numerical values.

In some embodiments, the processor is further configured to: compare a result of the sum to a threshold value, and predict that the autonomous vehicle will encounter the non-ODD scenario in response to the result of the sum being greater than the threshold value.

In some embodiments, the processor is further configured to: determine an action for the autonomous vehicle to take in response to the predicted non-ODD scenario.

In some embodiments, the determination of the action is based on the information received from the plurality of data sources as well as one or more of the following: a distance between the autonomous vehicle and a location of the non-ODD scenario, a number and location of another autonomous vehicle within a same fleet as the autonomous vehicle, and details of a predetermined map between the autonomous vehicle, the location of the non-ODD scenario, the destination, and/or a point of origin of the autonomous vehicle.

In some embodiments, the action comprises one or more of the following: execute a minimal risk condition (MRC) maneuver, pull over to a side of a road, take a next exit, take any exit before a location of the non-ODD scenario, reroute to a destination, and return to a point of origin.

In some embodiments, the plurality of data sources include one or more of the following: an accident information source, a construction zone source, a road condition source, a traffic information source, and a weather information source.

In another aspect, there is provided a method of predicting whether an autonomous vehicle will encounter a non-operational design domain (ODD) scenario, comprising: receiving information related to the navigation of the autonomous vehicle from a plurality of data sources; predicting whether the autonomous vehicle will encounter the non-ODD scenario based on the received information; and transmitting a signal to the autonomous vehicle in response to predicting that the autonomous vehicle will encounter the non-ODD scenario.

In some embodiments, the method further comprises: detecting one or more conditions related to the navigation of the autonomous vehicle based on the received information; and assigning a numerical value to each of the one or more conditions.

In some embodiments, the method further comprises: summing the numerical values; comparing a result of the sum to a threshold value; and predicting that the autonomous vehicle will encounter the non-ODD scenario in response to the result of the sum being greater than the threshold value.

In some embodiments, a first condition of the one or more conditions is detected based on information from a first group of multiple data sources of the plurality of the data sources.

In some embodiments, the one or more conditions comprise a plurality of conditions, and a second condition and a third condition of the plurality of conditions are detected based on information from a single data source of the plurality of the data sources.

In some embodiments, the method further comprises: applying a decision tree of binary options for a plurality of conditions used to predict whether the autonomous vehicle will encounter the non-ODD scenario.

In some embodiments, the decision tree identifies a plurality of combinations of the plurality of conditions which are predictive of the autonomous vehicle encountering the non-ODD scenario.

In some embodiments, the method further comprises: generating instructions to the autonomous vehicle to take an exit ahead of a location of the non-ODD scenario, wherein the signal comprises the instructions.

In yet another aspect, there is provided an autonomous vehicle comprising: a memory; a network communications subsystem configured to communicate with a remote oversight system; and a processor configured to: receive, via the network communications subsystem, a signal from the remote oversight system predicting that the autonomous vehicle will encounter a non-operational design domain (ODD) scenario; and determine an action for the autonomous vehicle to take in response to the predicted non-ODD scenario.

In some embodiments, the autonomous vehicle further comprises: at least one sensor configured to output sensor data, wherein the processor is further configured to: provide the sensor data to the remote oversight system as a source for predicting whether the autonomous vehicle will encounter the non-ODD scenario.

In some embodiments, the processor is further configured to communicate, via the network communications subsystem, with another autonomous vehicle within a same fleet to coordinate actions in response to the prediction of the non-ODD scenario.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Vehicles traversing highways and roadways are legally required to comply with regulations and statutes in the course of safe operation of the vehicle. For autonomous vehicles (AVs), particularly autonomous tractor trailers, the ability to recognize a malfunction in its systems and stop safely are necessary for lawful and safe operation of the vehicle. Described below in detail are systems and methods for the safe and lawful operation of an autonomous vehicle on a roadway, including the execution of maneuvers that bring the autonomous vehicle in compliance with the law while signaling surrounding vehicles of its condition.

Aspects of this disclosure relate to systems and techniques which provide an oversight system that can predict whether an autonomous vehicle will encounter a non-operational design domain (ODD) scenario. This enables the oversight system to automate a task which was previously at least partially manual, thereby avoiding errors in judgement from an operator of the oversight system.

Figure 1:
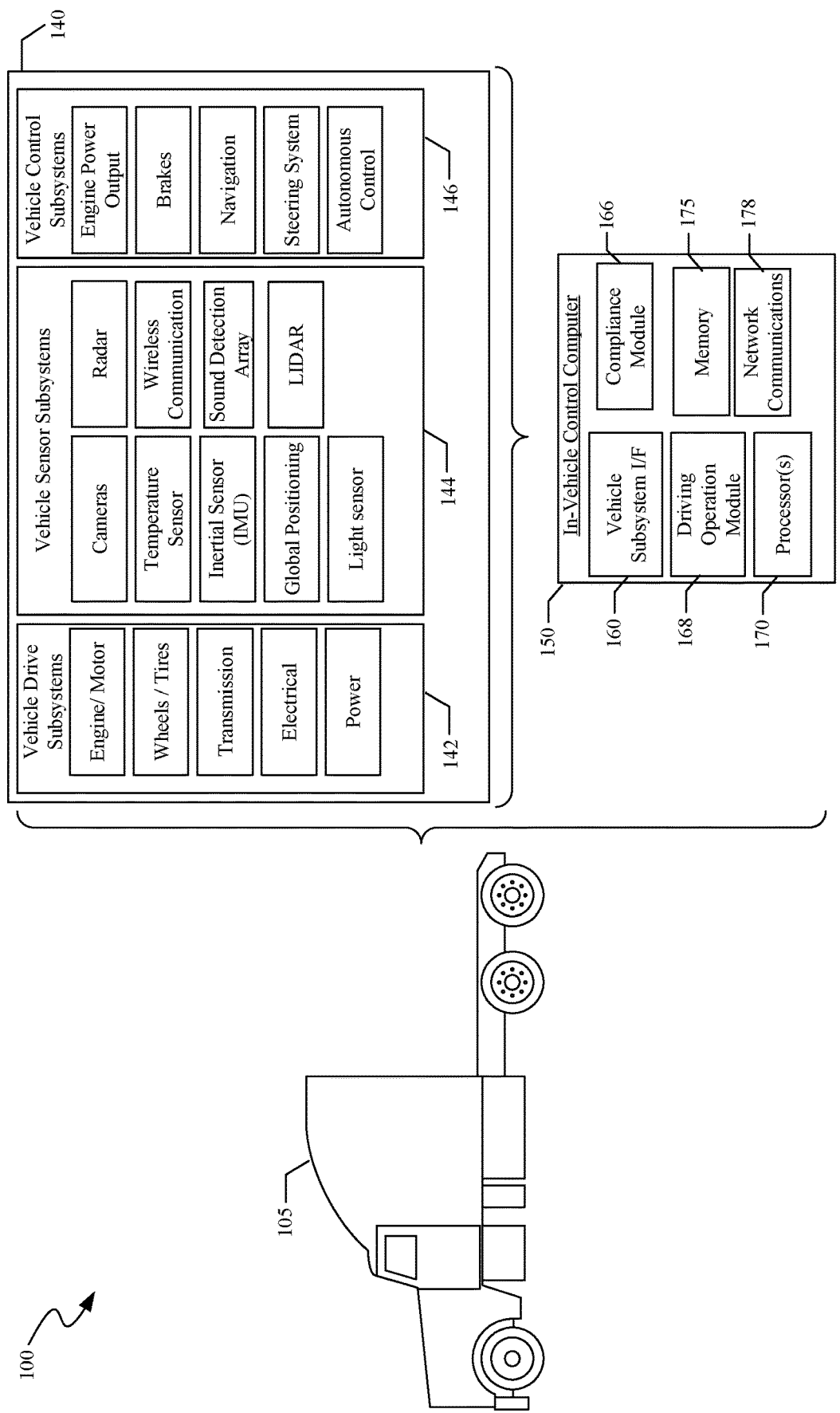
FIG. 1 illustrates a schematic diagram of a system including an autonomous vehicle.

FIG. 1 shows a system 100 that includes a tractor 105 of an autonomous truck. The tractor 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the tractor 105 moves. The tractor 105 have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous truck 105, including those which would indicate a malfunction in the AV or another cause for an AV to perform a limited or minimal risk condition (MRC) maneuver. The sensors for general operation of the autonomous vehicle may include cameras, a temperature sensor, an inertial sensor (IMU), a global positioning system (GPS), a light sensor, a LIDAR system, a radar system, and wireless communications.

A sound detection array, such as a microphone or array of microphones, may be included in the vehicle sensor subsystem 144. The microphones of the sound detection array are configured to receive audio indications of the presence of, or instructions from, authorities, including sirens and command such as "Pull over." These microphones are mounted, or located, on the external portion of the vehicle, specifically on the outside of the tractor portion of an autonomous truck 105. Microphones used may be any suitable type, mounted such that they are effective both when the autonomous truck 105 is at rest, as well as when it is moving at normal driving speeds.

Cameras included in the vehicle sensor subsystems 144 may be rear-facing so that flashing lights from emergency vehicles may be observed from all around the autonomous truck 105. These cameras may include video cameras, cameras with filters for specific wavelengths, as well as any other cameras suitable to detect emergency vehicle lights based on color, flashing, of both color and flashing.

The vehicle control subsystem 146 may be configured to control operation of the autonomous vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the autonomous vehicle 105.

The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR (i.e., LIDAR), the cameras, and/or other vehicle subsystems to determine the driving path or trajectory for the autonomous vehicle 105. The autonomous control that may activate systems that the autonomous vehicle 105 has which are not present in a conventional vehicle, including those systems which can allow the autonomous vehicle 105 to communicate with surrounding drivers or signal surrounding vehicles or drivers for safe operation of the autonomous vehicle 105.

An in-vehicle control computer 150, which may be referred to as a VCU, includes a vehicle subsystem interface 160, a driving operation module 168, one or more processors 170, a compliance module 166, a memory 175, and a network communications subsystem 178. This in-vehicle control computer 150 controls many, if not all, of the operations of the autonomous truck 105 in response to information from the various vehicle subsystems 140. The one or more processors 170 execute the operations that allow the system to determine the health of the autonomous vehicle 105, such as whether the autonomous vehicle 105 has a malfunction or has encountered a situation requiring service or a deviation from normal operation and giving instructions. Data from the vehicle sensor subsystems 144 is provided to VCU 150 so that the determination of the status of the autonomous vehicle 105 can be made. The compliance module 166 determines what action should be taken by the autonomous truck 105 to operate according to the applicable (i.e., local) regulations. Data from other vehicle sensor subsystems 144 may be provided to the compliance module 166 so that the best course of action in light of the AV's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146 including the autonomous Control system. The in-vehicle control computer (VCU) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the VCU 150 may send information to the vehicle control subsystems 146 to direct the trajectory, velocity, signaling behaviors, and the like, of the autonomous vehicle 105. The autonomous control vehicle control subsystem may receive a course of action to be taken from the compliance module 166 of the VCU 150 and consequently relay instructions to other subsystems to execute the course of action.

Figure 2:
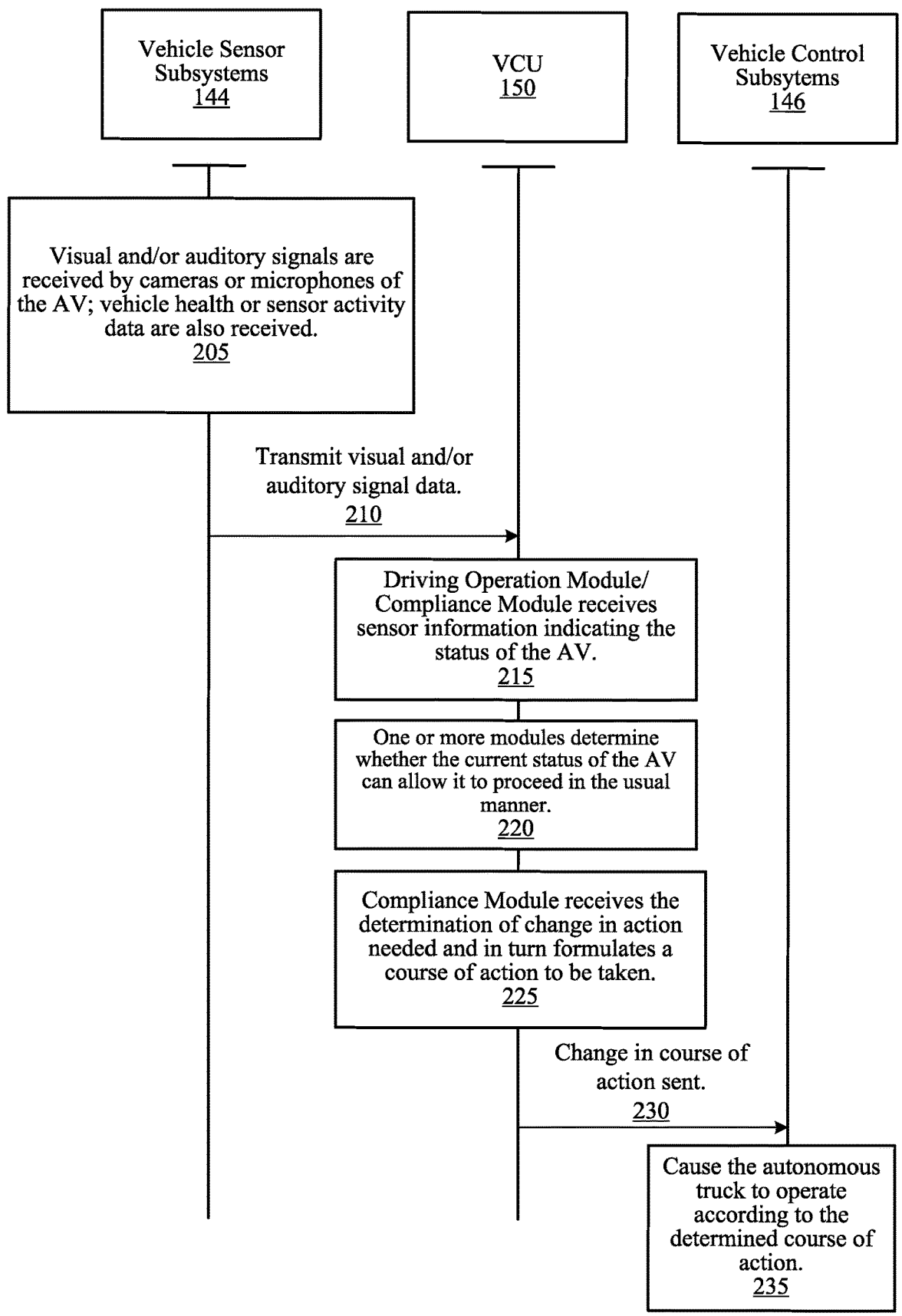
FIG. 2 shows a flow diagram for operation of an autonomous vehicle (AV) safely in light of the health and surroundings of the AV.

FIG. 2 shows a flow diagram for operation of an autonomous vehicle (AV) 105 safely in light of the health and surroundings of the autonomous vehicle 105. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

As shown in FIG. 2, the vehicle sensor subsystem 144 receives visual, auditory, or both visual and auditory signals indicating the at the environmental condition of the autonomous vehicle 105, as well as vehicle health or sensor activity data are received in step 205. These visual and/or auditory signal data are transmitted from the vehicle sensor subsystem 144 to the in-vehicle control computer system (VCU) 150, as in step 210. Any of the driving operation module and the compliance module receive the data transmitted from the vehicle sensor subsystem, in step 215. Then, one or both of those modules determine whether the current status of the autonomous vehicle 105 can allow it to proceed in the usual manner or that the autonomous vehicle 105 needs to alter its course to prevent damage or injury or to allow for service in step 220. The information indicating that a change to the course of the autonomous vehicle 105 is needed may include an indicator of sensor malfunction; an indicator of a malfunction in the engine, brakes, or other components necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the AV's course of action is needed may be used by the compliance module to formulate a new course of action to be taken which accounts for the AV's health and surroundings, in step 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in step 230. The vehicle control subsystems 146 then cause the autonomous vehicle 105 to operate in accordance with the course of action to be taken that was received from the VCU 150 in step 235.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

Autonomous Vehicle Oversight System

Figure 3:
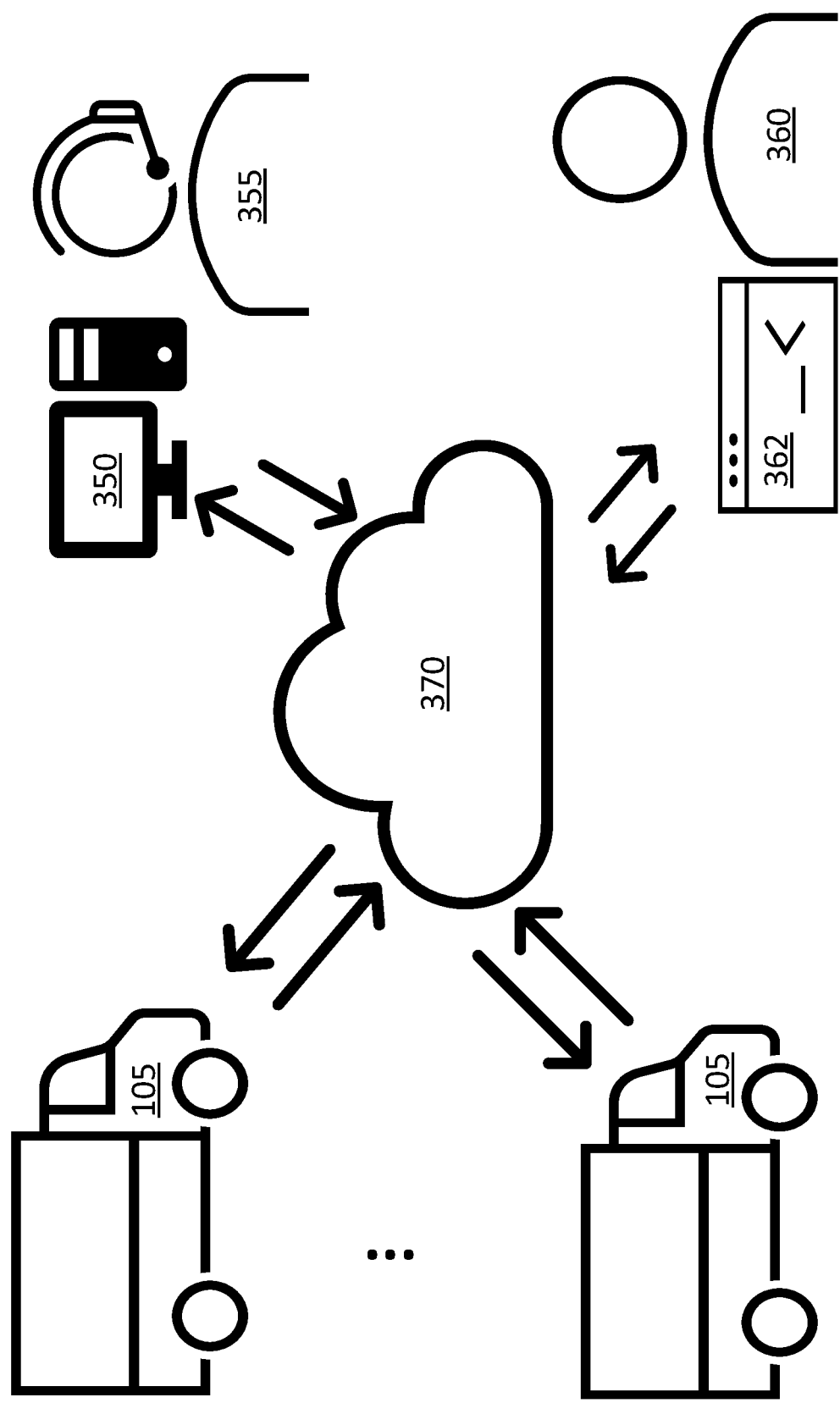
FIG. 3 illustrates a system that includes one or more autonomous vehicles, a control center or oversight system with a human operator (e.g., a remote center operator (RCO)), and an interface for third party interaction.

FIG. 3 illustrates a system 300 that includes one or more autonomous vehicles 105, a control center or oversight system 350 with a human operator 355, and an interface 362 for third party 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1, the VCU 150 of each autonomous vehicle 105 may include a module for network communications 178.

An autonomous vehicle 105 may be in communication with the oversight system 350. The oversight system 350 may serve many purposes, including: tracking the progress of one or more autonomous vehicles 105 (e.g., an autonomous truck); tracking the progress of a fleet of autonomous vehicles 105; sending maneuvering instructions to one or more autonomous vehicles 105; monitoring the health of the autonomous vehicle(s) 105; monitoring the status of the cargo of each autonomous vehicle 105 in contact with the oversight system 350; facilitate communications between third parties (e.g., law enforcement, clients whose cargo is being carried) and each, or a specific, autonomous vehicle 105; allow for tracking of specific autonomous vehicles 105 in communication with the oversight system 350 (e.g., third party tracking of a subset of vehicles in a fleet); arranging maintenance service for the autonomous vehicles 105 (e.g., oil changing, fueling, maintaining the levels of other fluids); alerting an affected autonomous vehicle 105 of changes in traffic or weather that may adversely impact a route or delivery plan; pushing over the air updates to autonomous vehicles 105 to keep all components up to date; and other purposes or functions that improve the safety for the autonomous vehicle 105, its cargo, and its surroundings. An oversight system 350 may also determine performance parameters of the autonomous vehicle 105 (e.g. an autonomous truck), including any of: data logging frequency, compression rate, location, data type; communication prioritization; how frequently to service the autonomous vehicle 105 (e.g., how many miles between services); when to perform a minimal risk condition (MRC) maneuver while monitoring the vehicle's progress during the maneuver; when to hand over control of the autonomous vehicle 105 to a human driver (e.g., at a destination yard); ensuring the autonomous vehicle 105 passes pre-trip inspection; ensuring the autonomous vehicle 105 performs or conforms to legal requirements at checkpoints and weight stations; ensuring the autonomous vehicle 105 performs or conforms to instructions from a human at the site of a roadblock, cross-walk, intersection, construction, or accident; and the like.

To allow for communication between autonomous vehicles 105 in a fleet and the oversight system 350, each autonomous vehicle 105 may be equipped with a communication gateway. The communication gateway may have the ability to do any of the following: allow for AV to oversight system communication (i.e. V2C) and the oversight system to AV communication (C2V); allow for AV to AV communication within the fleet (V2V); transmit the availability or status of the communication gateway; acknowledge received communications; ensure security around remote commands between the autonomous vehicle 105 and the oversight system 350; convey the autonomous vehicle's location reliably at set time intervals; enable the oversight system 350 to ping the autonomous vehicle 105 for location and vehicle health status; allow for streaming of various sensor data directly to the oversight system 350; allow for automated alerts between the autonomous vehicle 105 and the oversight system 350; comply to ISO 21434 standards; and the like.

The oversight system 350 may be operated by one or more human, also known as an operator or a remote center operator (RCO) 355. The operator 355 may set thresholds for autonomous vehicle health parameters, so that when an autonomous vehicle 105 meets or exceeds the threshold, precautionary action may be taken. Examples of vehicle health parameters for which thresholds may be established by the operator 355 may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer of the autonomous vehicle 105 in a towing situation (e.g., tractor-trailer, 18-wheeler, or semi-truck); unauthorized access by a living entity (e.g., a person or an animal) to the interior of the autonomous vehicle 105; and the like. The precautionary action may include execution of a minimal risk condition (MRC) maneuver, seeking service, or exiting a highway or other such re-routing that may be less taxing on the autonomous vehicle 105. An autonomous vehicle 105 whose system health data meets or exceeds a threshold set at the oversight system 350 or by the operator 355 may receive instructions that are automatically sent from the oversight system 350 to perform the precautionary action.

The operator 355 may be made aware of situations affecting one or more autonomous vehicles 105 in communication with or being monitored by the oversight system 350 that the affected autonomous vehicle(s) 105 may not be aware of. Such situations may include: irregular or sudden changes in traffic flow (e.g., traffic jam or accident); abrupt weather changes; abrupt changes in visibility; emergency conditions (e.g., fire, sink-hole, bridge failure); power outage affecting signal lights; unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle 105 may be brought to the attention of the operator 355 through traffic reports, law enforcement communications, data from other vehicles that are in communication with the oversight system 350, reports from drivers of other vehicles in the area, and similar distributed information venues. The autonomous vehicle 105 may not be able to detect such situations because of limitations of sensor systems or lack of access to the information distribution means (e.g., no direct communication with weather agency). An operator 355 at the oversight system 350 may push such information to affected autonomous vehicles 105 that are in communication with the oversight system 350. The affected autonomous vehicles 105 may proceed to alter their route, trajectory, or speed in response to the information pushed from the oversight system 350. In some instances, the information received by the oversight system 350 may trigger a threshold condition indicating that MRC (minimal risk condition) maneuvers are warranted; alternatively, or additionally, an operator 355 may evaluate a situation and determine that an affected autonomous vehicle 105 should perform an MRC maneuver and subsequently send such instructions to the affected vehicle. In these cases, each autonomous vehicle 105 receiving either information or instructions from the oversight system 350 or the operator 355 uses its on-board computing unit (i.e. VCU) to determine how to safely proceed, including performing an MRC maneuver that includes pulling-over or stopping.

Systems and Methods for Executing MRC Maneuvers

As described herein, an autonomous vehicle 105 may need to terminate autonomous navigation, which can involve stopping the autonomous vehicle 105 and/or pulling over to the side of the road under certain conditions, such as unsafe environmental conditions and/or mechanical/electrical malfunctions. In some situations, the autonomous vehicle 105 can be configured to perform an MRC maneuver in which the autonomous vehicle 105 autonomously maneuvers to a stopping location. In some embodiments, the MRC maneuver can be performed under supervision of an operator 355 via the oversight system 350.

In some implementations, the operator 355 may be tasked with observing the conditions in which one or more autonomous vehicles 105 are operating to identify any possible conditions and/or situations which are outside of the autonomous vehicle's 105 operational design domain (ODD). As user herein, the autonomous vehicle's 105 ODD may refer to the set of conditions and/or situations for which the autonomous vehicle 105 is able to safely operate at a high confidence level (e.g., a confidence level above a threshold value). However, due to certain limitations (e.g., limitations in the ability of one or more of the vehicle sensors to accurately sense the environment, limitations in the autonomous control system to respond to certain conditions and/or situations, etc.), the autonomous vehicle 105 may not be able to safely operate at a sufficient confidence level (e.g., above the threshold value). Such conditions and/or situations may be referred to as non-ODD scenarios.

There may be drawbacks associated with relying on an operator 355 to identify non-ODD scenarios. For example, the operator 355 may be distracted with other tasks or may not be able to accurately predict that the autonomous vehicle 105 will encounter a non-ODD scenario with sufficient lead time to enable the autonomous vehicle 105 to avoid the non-ODD scenario. Thus, aspects of this disclosure relate to systems and methods for predicting when one or more autonomous vehicles 105 may encounter a non-ODD scenario and techniques for avoiding and/or addressing any predicted non-ODD scenarios.

Figure 4:
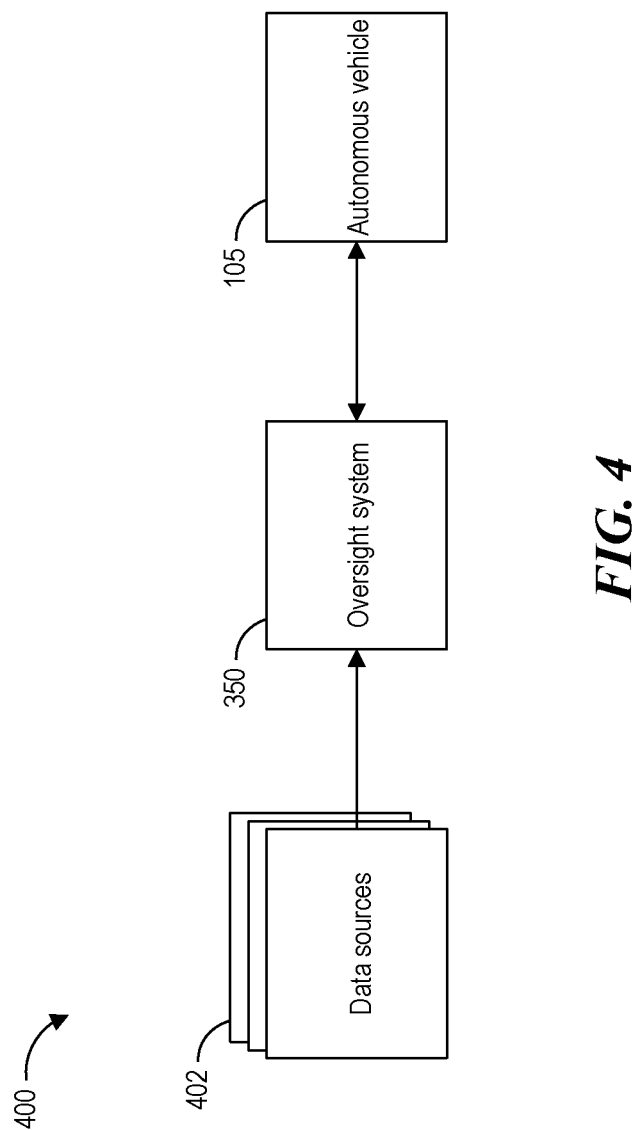
FIG. 4 illustrates a system for predicting non-operational design domain (ODD) scenarios in accordance with aspects of this disclosure.

FIG. 4 illustrates a system 400 for predicting non-operational design domain (ODD) scenarios in accordance with aspects of this disclosure. In certain embodiments, the system 400 includes a plurality of data sources 402, an oversight system 350, and one or more autonomous vehicles 105. The oversight system 350 is configured to receive data from the data sources 402 and predict whether the autonomous vehicle 105 will encounter a non-ODD scenario along the autonomous vehicle's 105 route. When the oversight system 350 predicts that the autonomous vehicle 105 will encounter a non-ODD scenario, the oversight system 350 can transmit a signal to the autonomous vehicle 105 to inform the autonomous vehicle 105 of the predicted non-ODD scenario. In some embodiments, the oversight system 350 may also provide instructions to the autonomous vehicle 105 regarding one or more actions to take in response to the predicted non-ODD scenario. In response to receiving the signal, the autonomous vehicle 105 can determine whether to take any action(s) in response to the predicted non-ODD scenario and execute the determined action(s).

Figure 5:
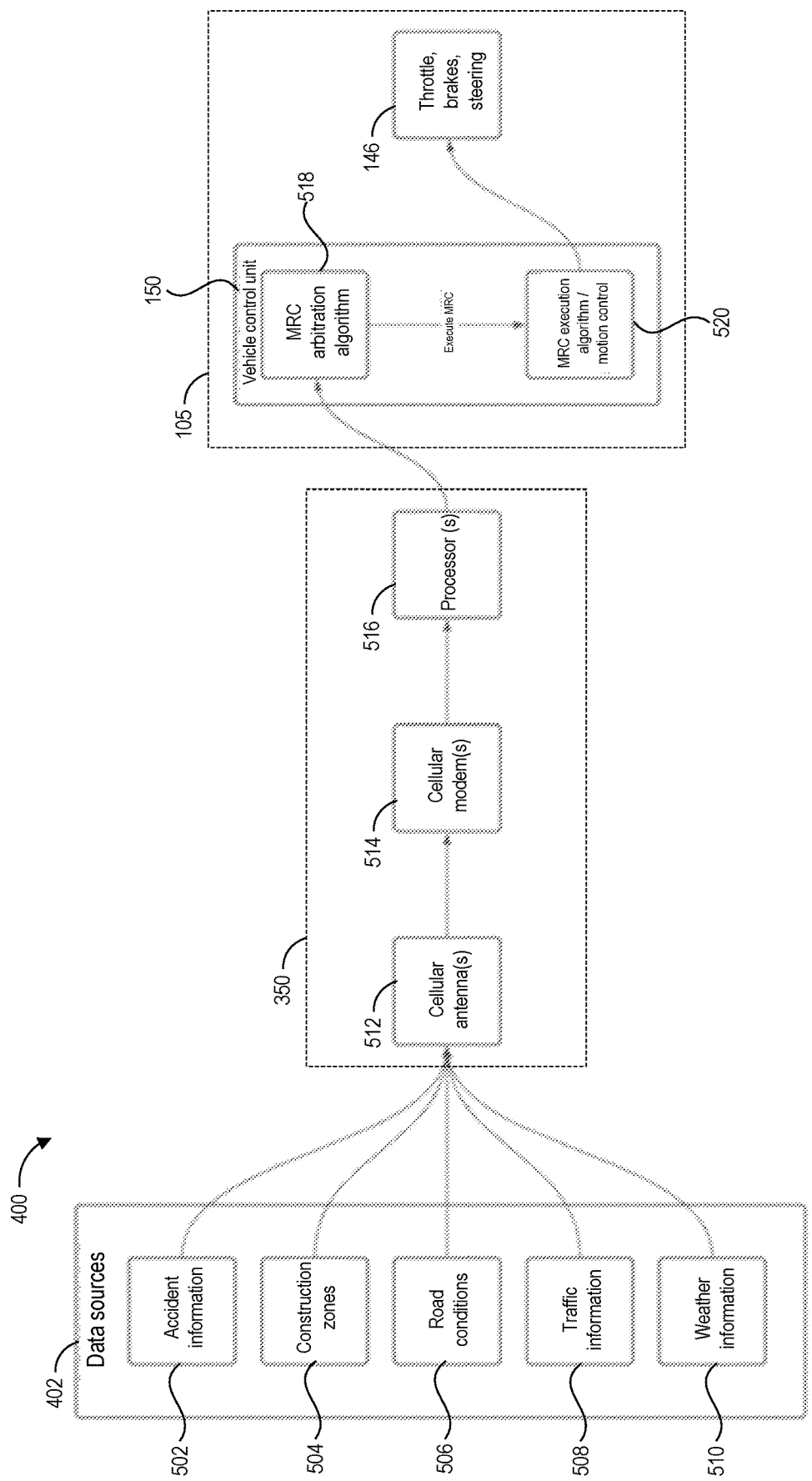
FIG. 5 illustrates an embodiment of the system for predicting non-ODD scenarios in accordance with aspects of this disclosure.

FIG. 5 illustrates an embodiment of the system 400 for predicting non-ODD scenarios in accordance with aspects of this disclosure. Similar to the embodiment of FIG. 4, the system 400, in certain embodiments, includes the plurality of data sources 402, the oversight system 350, and the autonomous vehicle 105. In the system 400 illustrated in FIG. 5, only a portion of the sub-components of the oversight system 350 and the autonomous vehicle 105 are illustrated, however, those skilled in the art will recognize that the oversight system 350 and the autonomous vehicle 105 can include a variety of additional sub-components.

The data sources 402 can include information related to the navigation of the autonomous vehicle 105 which can be provided by one or more different entities. For example, the data sources 402 can include one or more of an accident information source 502, a construction zone source 504, a road condition source 506, a traffic information source 508, and a weather information source 510. However, these are merely examples and other data sources 402 which may be indicative of the conditions and/or situations the autonomous vehicle 105 will experience can also be used.

One or more of the data sources 402 can be available over the cloud. For example, the weather information source 510 may be available from a public database, such as from the national oceanic and atmospheric administration's (NOAA's) national weather service. In addition, one or more of the data sources 402 can be available from one or more private database. For example, other autonomous vehicles 105 within a fleet of autonomous vehicles 105 may be configured to generate and transmit data which can be used by the oversight system 350. In one example embodiment, the autonomous vehicle's 105 vehicle sensor subsystems 144 may be configured to collect data indicative of one or more of: accident information, construction zones, road conditions, traffic information, historical information (e.g., data captured from autonomous vehicles 105 driving through the same area), and/or weather information. The oversight system 350 may also receive information from the autonomous vehicle 105 itself, which may include data substantially similar to the data received from the other autonomous vehicles 105 in the fleet.

The oversight system 350 can include, in certain embodiments, one or more cellular antennas 512, one or more cellular modems 514, and one or more processors 516. The cellular antenna(s) 512 are configured to wirelessly receive the information from one or more of the data sources 402 and the cellular modem(s) 514 are configured to convert the information received via the cellular antenna(s) 512 into a format readable by the processor(s) 516. However, in other embodiments, the oversight system 350 can receive the information from one or more of the data sources 402 using other technology, such as, via a wired Internet connection.

The oversight system 350 can combine the information received from each of the data sources 402 in order to predict whether the route of the autonomous vehicle 105 will enter a non-ODD scenario. In some implementations, the oversight system 350 is configured to execute an algorithm that combines the information received from the data sources 402 in order to predict whether the autonomous vehicle 105 will encounter a non-ODD scenario.

In some embodiments, the oversight system 350 can assign a value to the information received from each of the data sources 402, weight each of the assigned values, and sum the weighted values to generate a score that is predictive of whether the autonomous vehicle 105 will encounter a non-ODD scenario. In response to the score being greater than a threshold value, the oversight system 350 can transmit a signal to the autonomous vehicle 105 to inform the autonomous vehicle 105 of the predicted non-ODD scenario. In some embodiments, the signal to the autonomous vehicle 105 can include instructions to the autonomous vehicle 105 regarding one or more actions to take in response to the predicted non-ODD scenario, such as instruction to perform one or more of the following actions: execute an MRC maneuver, pull over to the side of the road, take the next exit, take any exit before a location of the non-ODD scenario, reroute to the destination, return to the point of origin, etc.

In one example embodiment, the oversight system 350 is configured to assign a numerical value between 0 and 1 for the information received from each of the data sources 402. For a given area or region, the oversight system 350 can assign a value corresponding to each data source 402 that reflects the severity of the road conditions based on the corresponding data source 402. For example, traffic can be assigned one of the following values corresponding to the severity or amount of traffic: light traffic=0.1, medium traffic=0.2, and heavy traffic=0.5. As another example, weather can be assigned one of the following values corresponding to the severity of the weather: sunshine=0, light rain=0.2, medium rain=0.35, heavy rain=0.7, blizzard=1.0.

The oversight system 350 can be configured to sum the values assigned to each of the data sources 402 and compare the result to a threshold value. In one example, the threshold value may be 0.8. Continuing the above examples, if there is light traffic based on the traffic information source 508 and medium rain based on the weather information source 510, the sum would be 0.45, and thus, the oversight system 350 would not predict a non-ODD scenario, allowing the autonomous vehicle 105 to continue without interruption. However, if there is heavy traffic based on the traffic information source 508 and medium rain based on the weather information source 510, the sum would be 0.85, and thus, the oversight system 350 would predict a non-ODD scenario and transmit a signal to the autonomous vehicle 105 to inform the autonomous vehicle 105 of the predicted non-ODD scenario.

In some embodiments, the oversight system 350 can identify a plurality different types of conditions related to the navigation of the autonomous vehicle 105 based on the data sources 402 and assign numerical values to the identified conditions. For example, a given condition may be detected based on the information from two or more data sources 402 and/or two or more conditions may be detected based on the information from a single one of the data sources 402. Examples of the types of conditions which may be assigned numerical values include: weather events, traffic events, traffic congestion, construction, disruptions in communication between the autonomous vehicle 105 and the oversight system 350, disruptions in GPS/positioning information streams, public announcements/warnings, any other types of conditions which have not been mapped or which do not allow for sufficient perception along a planned route of the autonomous vehicle 105.

In other embodiments, the oversight system 350 can be configured to predict whether the autonomous vehicle 105 will encounter a non-ODD scenario using an algorithm that does not involve assigning values to the data sources 402 and/or comparing the values of the data sources 402 to a threshold. For example, in some implementations, the oversight system 350 can apply a decision tree of binary options for various conditions which can be used to predict whether the autonomous vehicle 105 will encounter a non-ODD scenario. In particular, the decision tree may identify certain combinations of conditions identified by the data sources 402 which are predictive of the autonomous vehicle 105 encountering a non-ODD scenario.

In addition to predicting that the autonomous vehicle 105 will encounter a non-ODD scenario, the oversight system 350 can also determine an action for the autonomous vehicle 105 to take in response to the predicted non-ODD scenario. In certain embodiments, the oversight system 350 may determine the action based on the information received from the data sources 402 as well as one or more of the following: the distance between the autonomous vehicle 105 and the location of the non-ODD scenario, the number and locations of other autonomous vehicle 105 within the same fleet, and/or details of the predetermined map between the autonomous vehicle 105, the location of the non-ODD scenario, the destination, and the point of origin.

For example, when there is at least one exit between the autonomous vehicle 105 and the location of the non-ODD scenario, the oversight system 350 may generate instructions to the autonomous vehicle 105 to take the exit in order to avoid the non-ODD scenario. As another example, when the map indicates that there is an alternative route between the current location of the autonomous vehicle 105 and the destination which avoids the non-ODD scenario, the oversight system 350 may generate instructions to the autonomous vehicle 105 to reroute in order to avoid the non-ODD scenario.

Additionally, when there are a plurality of autonomous vehicles 105 within the same fleet which are approaching the non-ODD scenario, the oversight system 350 may generate instructions to take different actions for the autonomous vehicles 105 so that the actions taken by the autonomous vehicles 105 do not cause traffic congestion or other issues. For example, if all of the autonomous vehicles 105 were instructed to take the same exit and/or the same detour, it may result in excessive traffic. Thus, the oversight system 350 may instruct the autonomous vehicles 105 to take different exits and/or different alternative routes in order to avoid creating traffic congestion. The oversight system 350 may also instruct one or more of the autonomous vehicles 105 to perform an MRC maneuver if those autonomous vehicles 105 cannot avoid the non-ODD scenario and/or those autonomous vehicles 105 would generate traffic congestion if they were to take an alternative route.

In some embodiments, the autonomous vehicle 105 may determine what action(s) to take to avoid the non-ODD scenario rather than the oversight system 350. For example, in response to receiving the signal predicting that the autonomous vehicle 105 will encounter a non-ODD scenario, the autonomous vehicle 105 may determine an action based on some or all of the same factors described above in connection with the oversight system 350 generating instructions for the autonomous vehicle 105. In these embodiments, the autonomous vehicle 105 may be configured to communicate with other autonomous vehicles 105 in the same fleet to coordinate actions in order to avoid creating traffic congestion.

Figure 6:
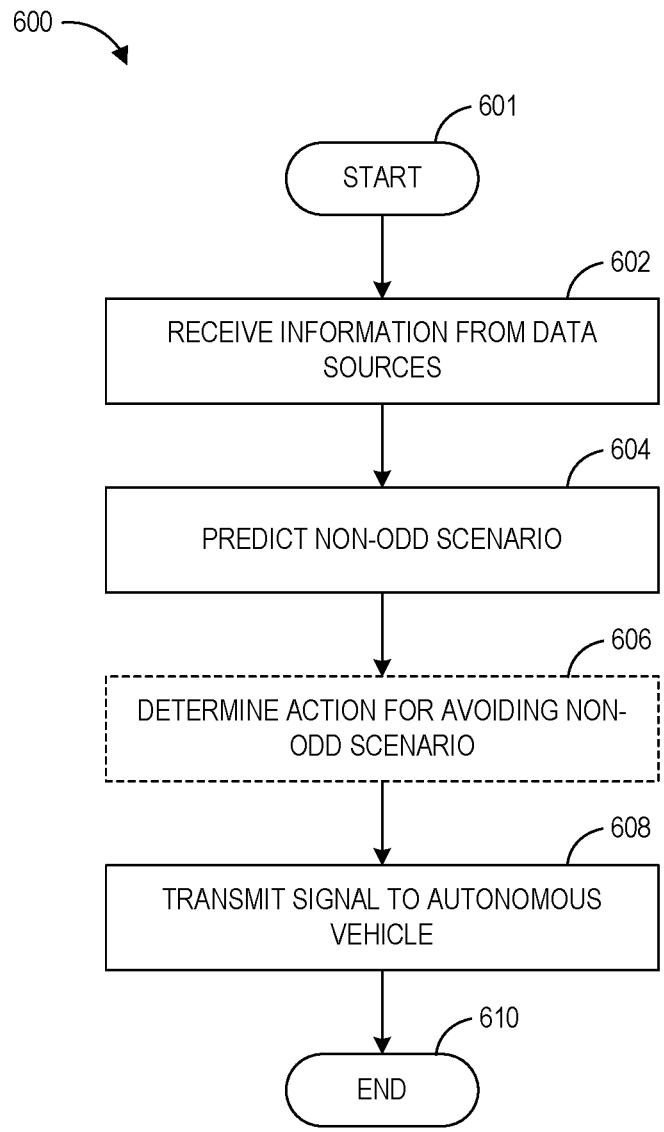
FIG. 6 is a flowchart illustrating a method for predicting whether an autonomous vehicle will encounter a non-ODD scenario in accordance with aspects of this disclosure.

FIG. 6 is a flowchart illustrating a method 600 for predicting whether an autonomous vehicle 105 will encounter a non-ODD scenario in accordance with aspect of this disclosure. With reference to FIG. 6, one or more blocks of the method 600 may be implemented, for example, by a processor 516 of the oversight system 350. The method 600 begins at block 601.

At block 602, the processor 516 is configured to receive information from a plurality of data sources 402. For example, the oversight system 350 can receive information from each of the data sources 502-510 via the cloud.

At block 604, the processor 516 is configured to predict whether the autonomous vehicle 105 will encounter a non-ODD scenario based on the information received from the plurality of data sources 402. In some embodiments, the processor 516 is configured to assign numerical values to the information received from each of the data sources 402, sum the numerical values, and compare the results of the sum to a threshold value. In response to the sum being greater than the threshold value, the processor 516 can predict that the autonomous vehicle 105 will encounter the non-ODD scenario.

At optional block 606, the processor 516 is configured to determine an action for avoiding the non-ODD scenario. The processor 516 may determine whether any action can be taken to avoid the non-ODD scenario (e.g., by rerouting to the destination to avoid a location of the non-ODD scenario) and/or whether the autonomous vehicle 105 should perform an MRC maneuver to stop driving until the non-ODD scenario is resolved.

At block 608, the processor 516 is configured to transmit a signal to the autonomous vehicle 105 to inform the autonomous vehicle 105 of the predicted non-ODD scenario. In some embodiments, the signal may also include the action determined in block 606. The method 600 ends at block 610.

Aspects of this disclosure can reduces the risk of human error by predicting or anticipating non-ODD scenarios in place of an operator 355 of the oversight system 350. For example, a remote operator 355 may accidentally forget to execute an MRC maneuver when required. One example scenario is a heavy snowstorm blowing through an area about 25 miles away on the route of an autonomous vehicle 105 heading towards its destination. A remote operator 355 may notice this scenario and decide to wait until the autonomous vehicle 105 is 5 miles away before pulling over. However, the remote operator 355 may instead forget, which may lead to a hazardous scenario. In addition, aspects of this disclosure prevents remote operators 355 with malicious intent from exposing the autonomous vehicles 105 to hazardous scenarios.

By automating the detection and management of non-ODD scenarios, aspects of this disclosure can address the above-indicated problems. Thus, the oversight system 350 can send instructions to one or more autonomous vehicles 105 to take action(s) without intervention of a human operator 355 such that the instruction action(s) are not instigated too late or unnecessarily. In some implementations, the oversight system 350 may function as a backup system for the remote operator 355, and thus, only inform the autonomous vehicle 105 of the predicted non-ODD scenario in the event that the remote operator 355 fails to act before the autonomous vehicle 105 is within a predetermined range of the location of the non-ODD scenario.

CONCLUSION

Though much of this document refers to an autonomous truck, it should be understood that any autonomous ground vehicle may have such features. Autonomous vehicles which traverse over the ground may include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A server comprising:
    a network communication device configured to communicate with an autonomous vehicle over a network;
    a memory; and
    at least one processor configured to:
        receive information related to navigation of the autonomous vehicle from a plurality of data sources,
        predict whether the autonomous vehicle will encounter a non-operational design domain (ODD) scenario based on the received information, and
        transmit a signal to the autonomous vehicle in response to predicting that the autonomous vehicle will encounter the non-ODD scenario;
    wherein the at least one processor is further configured to:
        assign a numerical value to the information received from each of the plurality of data sources, and
        sum the numerical values, wherein the prediction of whether the autonomous vehicle will encounter the non-ODD scenario is further based on the sum of the numerical values;
    wherein, in response to the signal, the autonomous vehicle takes an action in response to the predicted non-ODD scenario.

2. The server of claim 1, wherein at least one of the plurality of data sources is available via the cloud.

3. The server of claim 1, wherein at least one of the plurality of data sources comprises another autonomous vehicle within a same fleet as the autonomous vehicle.

4. The server of claim 1, wherein the at least one processor is further configured to:
compare a result of the sum to a threshold value, and predict that the autonomous vehicle will encounter the non-ODD scenario in response to the result of the sum being greater than the threshold value.

5. The server of claim 1, wherein the at least one processor is further configured to:
determine the action for the autonomous vehicle to take in response to the predicted non-ODD scenario.

6. The server of claim 5, wherein the determination of the action is based on the information received from the plurality of data sources as well as one or more of the following: a distance between the autonomous vehicle and a location of the non-ODD scenario, a number and location of another autonomous vehicle within a same fleet as the autonomous vehicle, and details of a predetermined map between the autonomous vehicle, the location of the non-ODD scenario, a destination, and/or a point of origin of the autonomous vehicle.

7. The server of claim 5, wherein the action comprises one or more of the following: execute a minimal risk condition (MRC) maneuver, pull over to a side of a road, take a next exit, take any exit before a location of the non-ODD scenario, reroute to a destination, and return to a point of origin.

8. The server of claim 1, wherein the plurality of data sources include one or more of the following: an accident information source, a construction zone source, a road condition source, a traffic information source, and a weather information source.

9. A method of predicting whether an autonomous vehicle will encounter a non-operational design domain (ODD) scenario, comprising:
receiving information related to navigation of the autonomous vehicle from a plurality of data sources;
predicting whether the autonomous vehicle will encounter the non-ODD scenario based on the received information;
transmitting a signal to the autonomous vehicle in response to predicting that the autonomous vehicle will encounter the non-ODD scenario;
assigning a numerical value to the information received from each of the plurality of data sources; and
summing the numerical values, wherein the prediction of whether the autonomous vehicle will encounter the non-ODD scenario is further based on the sum of the numerical values;
wherein, in response to the signal, the autonomous vehicle takes an action in response to the predicted non-ODD scenario.

10. The method of claim 9, further comprising:
detecting one or more conditions related to the navigation of the autonomous vehicle based on the received information; and
assigning the numerical value to each of the one or more conditions.

11. The method of claim 10, further comprising:
comparing a result of the sum to a threshold value; and
predicting that the autonomous vehicle will encounter the non-ODD scenario in response to the result of the sum being greater than the threshold value.

12. The method of claim 10, wherein a first condition of the one or more conditions is detected based on information from a first group of multiple data sources of the plurality of the data sources.

13. The method of claim 12, wherein:
the one or more conditions comprise a plurality of conditions, and
a second condition and a third condition of the plurality of conditions are detected based on information from a single data source of the plurality of the data sources.

14. The method of claim 9, further comprising:
applying a decision tree of binary options for a plurality of conditions used to predict whether the autonomous vehicle will encounter the non-ODD scenario.

15. The method of claim 14, wherein the decision tree identifies a plurality of combinations of the plurality of conditions which are predictive of the autonomous vehicle encountering the non-ODD scenario.

16. The method of claim 9, further comprising:
generating instructions to the autonomous vehicle to take an exit ahead of a location of the non-ODD scenario, wherein the signal comprises the instructions.

* * * * *